United States Patent Office.

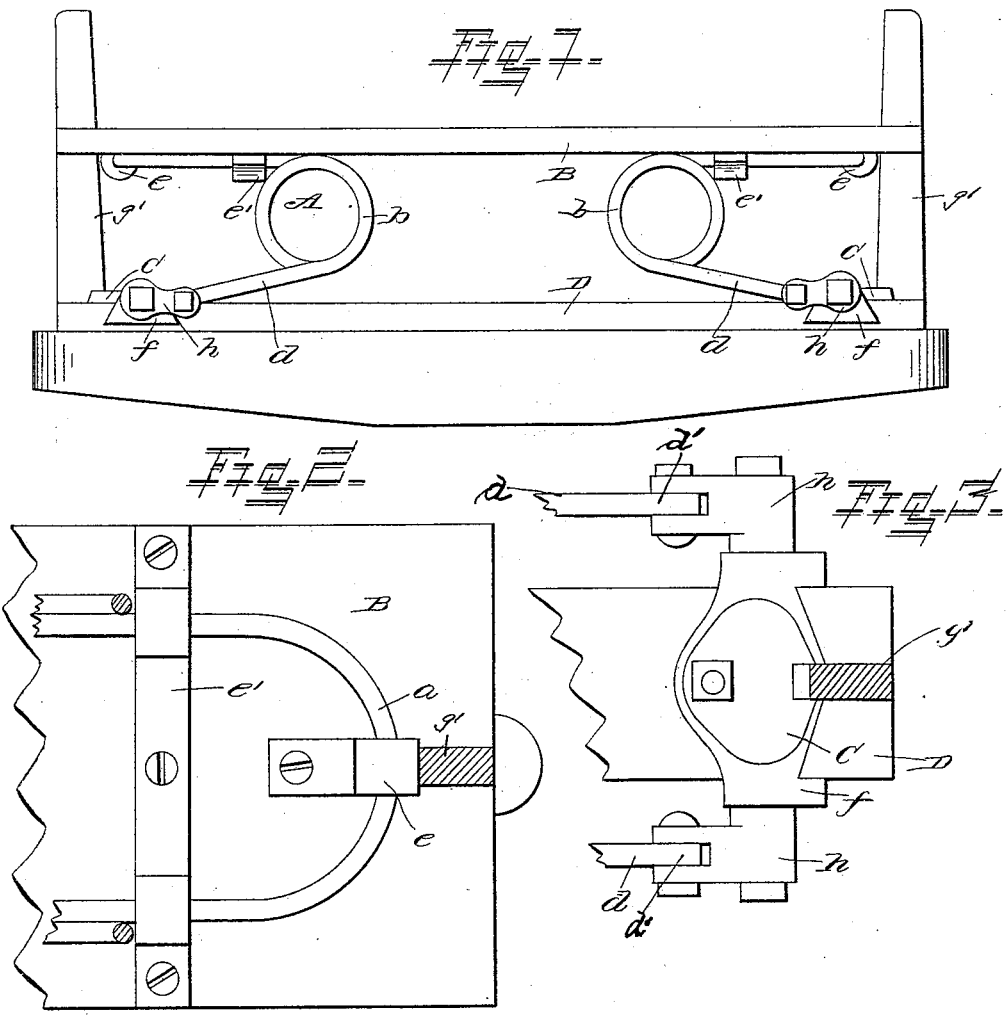

SAMUEL HUNT, OF LOCKPORT, NEW YORK, ASSIGNOR OF TWO-THIRDS TO LAVANDO SHARP, OF SAME PLACE, AND BENJAMIN F. FELTON, OF WHEATFIELD, NEW YORK.

VEHICLE-SPRING.

SPECIFICATION forming part of Letters Patent No. 342,750, dated May 25, 1886.

Application filed January 18, 1886. Serial No. 188,908. (No model.)

*To all whom it may concern:*

Be it known that I, SAMUEL HUNT, a citizen of the United States of America, residing at Lockport, in the county of Niagara and State of New York, have invented certain new and useful Improvements in Vehicle-Springs, of which the following is a specification, reference being had therein to the accompanying drawings.

My invention pertains to an improvement in vehicle-springs, having for its object not only elasticity, but increased strength and durability; and the invention consists in the peculiar construction, combination, and arrangement of the parts, substantially as hereinafter more fully shown and described.

In the accompanying drawings, Figure 1 is a side view of my improved vehicle-spring, and Figs. 2 and 3 are detail views of the same.

In the construction of my vehicle-spring I employ two similar right and left springs, A A. These springs are each made of a single metallic rod or bar, and each spring comprises two vertically-arranged coils, $b$, parallel arms $d$, which terminate at both ends in eyes $d'$, and a horizontal and intermediate portion forming the U-shaped wing $a$. The U-shaped wings $a$ are secured to the bolster-board B by clips $e$ $e'$, the clip-casting $e$ having its under curved or recessed part fitting over the key of the arc of the curve of each wing, while the casting or double clip $e'$ has its under curved or recessed surface fitting over the inner ends of the rod or strand forming the U-shaped wing $a$. The clip $e$ is apertured for reception of screws, with which it and the wing $a$ are secured to the bolster, and the clip casting $e'$, having near each end thereof a curved recess for reception of the parallel sides of wing $a$, as aforesaid, is also provided with screw-apertures for fastening the wing to the bolster, as shown.

C C are two plates or yokes, each of which is provided on its upper surface near the ends with flanges $ff$, thus forming a recess in which is disposed the body-board D, which is bolted to said plates by means of bolt inserted in a corresponding orifice therein provided. Each plate or yoke C is also enlarged about midway its length, and on the outer edge of said enlargement it is provided with a recess, which receives a vertical standard guide, $g'$, and thus is retained and guided in place the body-board as it ascends and descends actuated by the expansion and contraction of the springs. The ends of the yokes or plates C are also thickened and provided with trunnions or arms, upon which oscillate knuckles $h$, to which are jointed or pivoted the eye or free ends of the extensions $d$ of the springs A, whereby is secured a highly-flexible and elastic connection between the body-board and the bolster and its board, and deflection and consequent weakening and breaking of the springs is avoided.

I am aware that it is not new to pivotally connect the ends of coil-springs of a wagon-body to the base-board; but my invention not only provides means for so securing said springs, but in addition thereto the yokes, on whose trunnions the knuckles to which said springs are connected are pivotally secured, are provided with flanges to securely retain them in position; and, further, the means by which I secure the springs to the under side of the bolster-board is an improvement over any similar means, inasmuch as the single clips are recessed on one end and the other end secured to the said bolster-board, and the double clips are also recessed for securing said springs, and are also secured to the bolster-board.

Having thus fully described my invention, what I claim, and desire to secure by Letters Patent, is—

The combination, with the clips having recesses for securing the springs to the under side of the bolster-board, of the yoke or plate having near each end a flange and the knuckles secured on trunnions or arms of said yoke or plate, and having the springs connected thereto, substantially as shown and described.

In testimony whereof I affix my signature in presence of two witnesses.

SAMUEL HUNT.

Witnesses:
 E. J. TAYLOR,
 J. P. SMITH.